Figure 1:
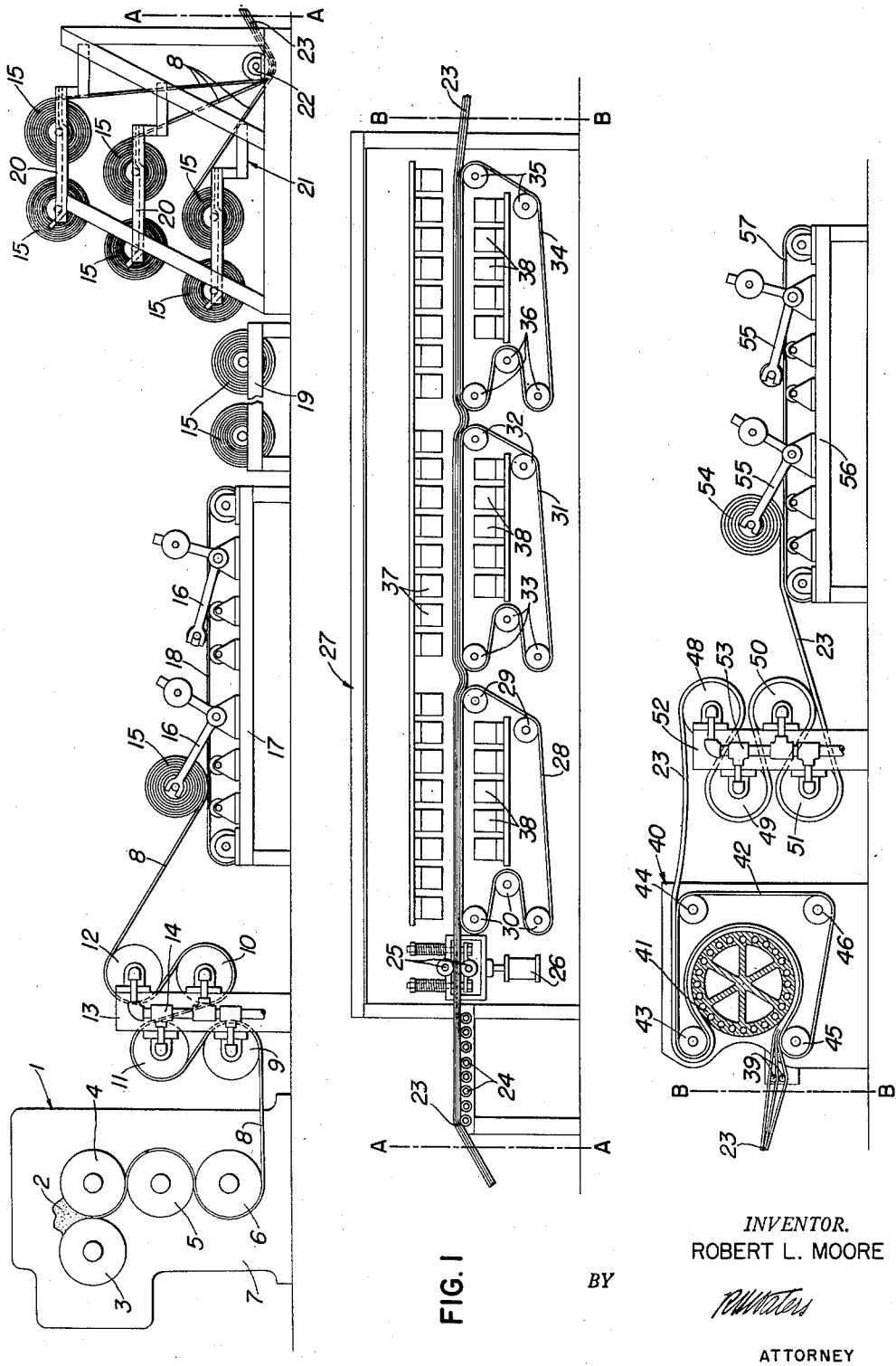

May 22, 1951     R. L. MOORE     2,554,150
PROCESS OF MANUFACTURING THERMOPLASTIC MATERIAL
Filed April 27, 1948     2 Sheets-Sheet 1

FIG. I

INVENTOR.
ROBERT L. MOORE
BY
ATTORNEY

May 22, 1951  R. L. MOORE  2,554,150
PROCESS OF MANUFACTURING THERMOPLASTIC MATERIAL
Filed April 27, 1948  2 Sheets-Sheet 2

INVENTOR.
ROBERT L. MOORE
BY
ATTORNEY

Patented May 22, 1951

2,554,150

UNITED STATES PATENT OFFICE 2,554,150

PROCESS OF MANUFACTURING THERMOPLASTIC MATERIAL

Robert L. Moore, Florence, Ala., assignor to Wingfoot Corporation, Akron, Ohio, a corporation of Delaware Application April 27, 1948, Serial No. 23,496

3 Claims. (Cl. 154—120)

The present invention relates to an improved method for the manufacture of thermoplastic material in the form of strips, sheets, films, and the like of substantially continuous length. More particularly, the process is concerned with the treatment of single and multiple ply strips or sheets of thermoplastic material, such, for example, as those employed for floor and wall covering material, matting, upholstering material, insulating material, and other similar products.

The manufacture of thermoplastic material in the form of sheets and strips is customarily accomplished by subjecting a body of the material concomitantly to the action of heat and pressure. Typical processes employed in the shaping of such material are calendering or extruding processes wherein the use of heat renders the material plastic and the application of pressure completes the shaping of the product. This working or kneading of the thermoplastic material results in the introduction to the product achieved in the forming step of certain stresses and strains which, if not relieved, will be translated into certain detrimental effects in the finished products.

In the manufacture of strips of thermoplastic material of substantially continuous lengths, it is esesntial to take steps to prevent subsequent shrinkage of the material resulting from the failure to properly relieve the aforementioned stresses and strains induced in the material by the forming operation. Unless these stresses and strains incident to the manufacture of strips or sheets of thermoplastic material are removed before it is put to use, serious and unpredictable shrinkages will occur slowly at ordinary room temperatures and more rapidly at elevated temperatures. This lack of uniformity in the product makes it imperative that steps be taken to remove these detrimental effects and it is the purpose of the present invention to accomplish this result among other things.

Many thermoplastic materials formed by a calendering or extruding operation tend to develop minute surface blemishes which impair the appearance of the product. It has been found that such common surface defects as small air or gas bubbles, hair cracks, and minor scratches are readily removed when the material is permitted to relax under heat and, thereafter, subjected to a pressing operation involving the application of uniform pressure and heat at a somewhat lower temperature than that of the relaxing step. The resultant surface finish is characterized by a high smooth luster. If desired, the pressing operation may be employed to impart a wide variety of distinct patterns or designs to the surface of the thermoplastic material.

In addition, the process of the present invention contemplates the simultaneous application of a hard, highly polished, wear and mar resistant surface to one side of the thermosplatic material and a somewhat roughened surface to the other side thereof to facilitate the application and adherence of various adhesives. The thermoplastic material may thus be manufactured in the form of a thin gauge stock and adhesively bonded to other base materials such as other plastic substances, fabrics, felting, padding, and the like.

Moreover, in its discontinuous phase, the process herein disclosed enables the production of sheets or strips of a variety of different gauges by plying up any desired number of individual thicknesses of thermoplastic material and intimately bonding the same together to form a finished product of the desired gauge. It is imperative in plying operations employing other base materials to insure that all of the stresses and strains induced in the thermoplastic material in its manufacture are completely removed and that the stock is in substantial equilibrium before it is bonded to the base material.

It is an object of the present invention to provide a process which will facilitate the production of high quality products from thermoplastic material formed by the coincident application of pressure and heat to the material.

It is a further object of the present invention to provide an economical process for the manufacture of calendered and/or extruded thermoplastic materials in the form of strips of predetermined width and gauge and of substantially continuous lengths.

Another important object of the invention is the provision of a method for treating thermoplastic material in the form of strips of substantially continuous length to relieve the stresses and strains induced in the material during the manufacture thereof.

It is to be understood that the process of the present invention is particularly adapted to the production and treatment of thermoplastic material of the type prepared either by a calendering operation or by an extrusion process embodying the coincident application of heat and pressure to the material as opposed to that class of thermoplastic material produced by a casting operation. The stresses and strains induced in calendered or extruded material by the heat and pressure incident to their manufacture are not present in products cast from solutions.

As examples of the thermoplastic material to the manufacture of which the process of the present invention is most advantageously applied are those organic polymerization products such as vinyl chloride, styrene, polyethylene, acrylic nitrile, acrylic or methacrylic esters or polymerization products of mixtures of the aforementioned compounds with each other or with other compounds polymerizable under the same conditions, as well as their conversion products. The process is of particular significance in the manufacture and treatment of polymerization products of vinyl chloride, including vinyl chloride alone or copolymers of vinyl chloride and other polymerizable substances. It will be readily understood that the addition of certain softening agents, pigments, dye stuffs, or common stabilizing agents may be made to the substances without materially affecting their reaction to the procedure employed in the present invention.

Figure 2:
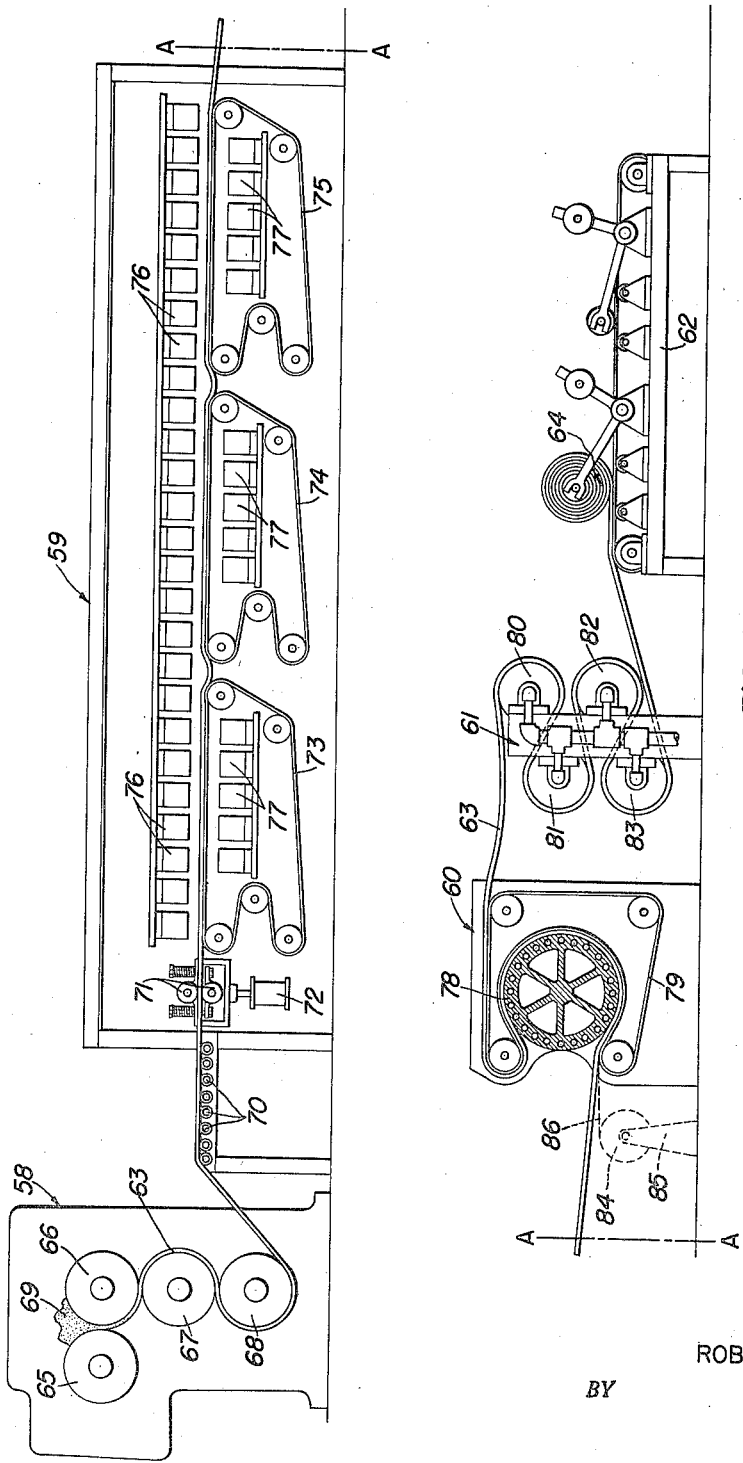

In the drawings, Fig. 1 represents a diagrammatic showing of an advantageous form of apparatus for carrying out the process of the invention as applied to the manufacture and treatment of thermoplastic material according to a discontinuous method. Fig. 2 is substantially similar to Fig. 1 and represents a diagrammatic showing of one form of apparatus for carrying out a continuous process for the manufacture and treatment of thermoplastic material.

In Fig. 1, the calender unit 1 is supplied with a body 2 of thermoplastic material which, by the action of the cooperating heated rolls 3, 4, 5, and 6 mounted in the frame 7 of the unit, is transformed into a substantially continuous strip 8. The calender unit 1 may take any conventional form and may employ any convenient number of heated rolls for the coincident application of heat and pressure to the body 2 of thermoplastic material to facilitate the formation of the continuous strip 8. As previously indicated, the calender unit 1, by the cooperative action of the heated rolls 3, 4, 5, and 6 thereof, tends to induce in the strip 8 of thermoplastic material certain stresses and strains which must be relieved to insure stability of the product which is formed from the material.

Any suitable form of sheet or strip of thermoplastic material may be manufactured or treated in accordance with the teachings of the process as outlined herein. In the present instance, the strip 8 of thermoplastic material is intended to be employed in the manufacture of floor covering material. The floor covering material in the present instance is composed of vinyl resins which, with the addition of suitable dyes and pigments, produce a form of floor covering which is both attractive and durable in use.

The strip 8 of thermoplastic material, after leaving the calender unit 1, is directed over a series of cooling drums 9, 10, 11, and 12, supported on the vertical frame 13 in a plurality of rotatable mountings. The several cooling drums 9, 10, 11, and 12 are adapted to be chilled by the introduction to the hollow interior thereof of a cooling liquid carried by a suitable piping system 14 from a supply tank (not shown). The liquid may take the form of cool or refrigerated water or other suitable forms of heat dissipating agents capable of being transmitted through the piping system 14 from a suitable supply.

After the strip 8 of thermoplastic material has been cooled to the proper degree, it is collected in the form of a roll or bundle 15 on a suitable wooden roll or kraft board insert supported by one of the counterweighted bell crank arms 16, which are used alternately, in the windup unit 17 for the continuous building up of bundles 15. The bell crank arms 16 cooperate with the endless belt 18 of the windup unit 17 to create a bundle of a predetermined size or length of material. The bundle 15 may be made up in any convenient size to facilitate handling of the material in the subsequent operations to be performed thereon.

After the bundle of material 15 of predetermined length has been built up on the windup unit 17, it is removed from the bell crank arm 16 and stored in a frame 19 temporarily to await the next step in the operations. A number of bundles 15 are removed from storage in the frame 19 and installed on each of the several supports 20 arranged in substantially parallel horizontal relation in the plying up unit 21.

It will be noted from Fig. 1 of the drawings that the right hand bundle 15 in each instance is being employed to feed a strip 8 of thermoplastic material under a freely rotatably mounted roll 22 to form a multiple ply product or laminated strip 23. As the right hand bundle 15 in each instance becomes depleted, the left hand bundle on each of the supports 20 will be shifted into the right hand position and additional strips 8 of the thermoplastic material will be fed to roll 22 to facilitate a substantially constant flow of the thermoplastic material into the apparatus.

The laminated strip 23 passes from the plying up unit 21 over a suitable supporting table 24, the upper surface of which is made up of a plurality of freely rotatably mounted rollers. The strip 23 is next directed between a pair of compressor or pinch rolls 25 to facilitate some degree of consolidation of the individual plies in the laminated strip 23. The degree of compression applied to the laminated strip 23 by the pinch rolls 25 is capable of being controlled by a pneumatic cylinder 26. At this point the laminated strip 23 is just being introduced to a heating zone or oven 27.

The laminated strip 23 first comes in contact with and is carried by an endless belt 28 supported upon and driven by two sets of pulleys 29 and 30. The belt 28 may conveniently be constructed in the form of open links which will serve to support the laminated strip 23. The open linkage of the endless belt 28 insures that the flow of heat in the oven 27 will not be obstructed from contact with the under surface of the thermoplastic material comprising the laminated strip 23.

As the laminated strip 23 continues on its path through the oven 27, it next contacts and is carried by an endless belt 31 identical to the belt 28 and supported and driven by the sets of pulleys 32 and 33. From the belt 31, the laminated strip 23 next passes to an endless belt 34 which is identical to its predecessors 28 and 31, being supported and driven by the sets of pulleys 35 and 36.

A suitable gearing arrangement and change speed mechanism (not shown) is provided for the actuation of the several endless belts 28, 31, and 34 in the oven 27 to enable a predetermined timed driving relationship between the several belts. This arrangement will permit a controlled relaxation of the laminated strip 23 between each successive pair of belts as indicated in the drawing.

This driving relationship between the several belts 28, 31, and 34 insures that the laminated strip 23 will be supported throughout its path within the oven 27 in a substantially completely relaxed condition and entirely free from tension.

The oven 27 may be heated in any suitable fashion. The infra-red lamps 37 and 38 which are shown in Fig. 1 of the drawing provide one suitable form of heat producing medium which will enable the maintenance of a substantially constant range of temperatures throughout the over-all dimensions of the oven 27. The lamps 37 and 38 of each bank serve to apply the heat induced thereby directly to the surface of the laminated strip 23 as it passes through the oven.

It will be noted that the series of infra-red lamps 37 are supported from the ceiling of the oven. Suitable reflector structures, not illustrated in detail, may be employed in the top and sidewalls of the oven to produce a maximum reflective surface to facilitate the direction of the heat provided by the lamps 37 upon the moving laminated strip 23. A similar series of infra-red lamps 38 is supported beneath and internally of the endless belts 28, 31, and 34 with a similar arrangement of reflective surfaces to direct the heat through the linkage of the several belts against the undermost surface of the laminated strip 23.

After the laminated strip 23 emerges from the oven 27, the several individual plies thereof are temporarily separated from each other by a series of spaced rods 39 extending laterally of the path of travel of the laminated strip 23 and disposed substantially parallel to each other. In certain circumstances, it has been found necessary to produce a temporary separation of only the uppermost ply of material comprising the laminated strip 23 after it emerges from the oven 27. It may be desirable, however, to provide a temporary separation of all of the several plies to insure the removal of any air or gases which may have become entrapped between the several plies in the course of the annealing operation performed in the oven 27. This temporary separation of plies advantageously takes place immediately prior to the entry of the material into the polishing unit 40.

The polishing unit 40 comprises a large rotatably mounted, internally heated drum 41 in contact with the major portion of the periphery of which is a cooperating belt 42. The belt 42 is endless and supported by a series of pulleys 43, 44, 45, and 46 of which the latter is provided with a jack or other suitable form of adjustment (not shown) to insure a high and predetermined degree of compression of the belt 42 against the periphery of the heated drum 41 ranging from 40 to 80 pounds per square inch. The laminated strip 23 passes into the bite between the belt 42 and the heated drum 41 and is simultaneously subjected to heat and pressure, thereby producing a substantial pressing effect upon the laminated strip to facilitate the consolidation of the individual laminae into a composite material. The operation of the polishing unit 40 is carefully synchronized with the several belts 28, 31 and 34.

It is important to note at this point the fact that the heat developed in the oven 27 for the purpose of annealing the laminated strip 23 closely approaches, but is not in excess of, the temperature at which the thermoplastic material comprising the strip will melt. This temperature will, of course, vary depending upon the nature of the thermoplastic material being processed. Certain copolymers will not only have specific melting points, but these may also be varied by the type and quantity of the softening agents, stabilizing agents, pigments, and other substances added. The usual operating range of temperatures employed in this operation, however, will vary from approximately 300 to 400 degrees F.

In the polishing unit 40 it has been found to be desirable to employ heat in the heated drum 41 at temperatures somewhat below those employed in the oven 27 for the annealing operation. Thus, the temperature of the heated drum 41 of the polishing unit 40 may be varied from 250 to 350 degrees F. for the correspondingly higher temperatures employed in the oven 27. The drum 41 is provided with a stainless steel peripheral surface for contact with one surface of the laminated strip 23 and it is this surface which provides a highly polished, hard wearing, mar-resistant coat for the laminated strip 23 which emerges from the polishing unit 40.

As the laminated strip 23 is removed from the polishing unit 40, it is directed over the surfaces of a series of cooling drums 48, 49, 50, and 51 (similar to that previously described as cooperating with the calendering unit 1) and supported by a frame 52. The several cooling drums 48, 49, 50, and 51 are supplied with a cooling medium from a suitable piping system 53. The laminated strip 23 is thereafter collected in the form of a bundle 54 of predetermined length on a suitable insert supported by one of the counterweighted bell crank arms 55 of the windup unit 56. The construction of the windup unit 56 is substantially identical to that of the windup unit 17 previously described and embodies an endless belt 57 which serves to feed the laminated strip 23 into the bundle 54 in the formation thereof.

The bundles 54 of the finished material are removed from the windup 56 and are ready to be transferred to an inspection and trimming unit (not shown) in which the material is trimmed to the proper predetermined dimensions, simultaneously inspected and wrapped ready for shipment. The resultant product, in this case, floor covering material, is highly advantageous in that it provides a hard, highly polished, mar-resistant surface with long wearing qualities. The introduction of various forms and colors of pigments, dyes, and the like to the body of the material 2, as it is processed in the calender unit 1, will produce a finished product which possesses both beauty and utility.

The apparatus illustrated in Fig. 2 of the drawings is, in general, quite similar to that of the apparatus just described, the primary difference being in the fact that the calender unit 58 of the apparatus of Fig. 2 feeds the material directly into the oven 59 performing the annealing operation. The polishing unit 60, the cooling apparatus 61, and the windup unit 62, receive the material, in turn, and cooperate with the calender unit 58 and oven 59 to afford a continuous processing operation from the formation of the substantially continuous strip 63 of thermoplastic material to its collection in the form of the bundle 64. This continuous operation is highly advantageous in the production of a single ply material of predetermined width and gauge. It is important, however, that the speed of operation of the calender unit 58, the several belts in the oven 59, and the polishing unit 60 be carefully synchronized to insure proper relaxation of the strip 63 of thermoplastic material.

The calender unit 58, as in the case of the calender unit 1 of the apparatus of Fig. 1, comprises a series of rolls 65, 66, 67, and 68 which reduce, by the action of heat and pressure, the body of thermoplastic material 69 into the substantially continuous strip of material 63 which is directed onto the table 70. The strip 63 passes into the oven 59 between the pinch rolls 71, the degree of compression of which is controlled by the pneumatic cylinder 72 and onto the successive endless belts 73, 74, and 75, each of which are driven by suitable supporting pulleys actuated by gearing mechanisms at a rate such as to permit a distinct relaxation of the strip 63 of thermoplastic material as it passes through the oven 59. The strip 63 is subjected to the heat induced by the infra-red lamps 76 and 77 in the oven 59 while being supported in a substantially completely relaxed condition.

The strip 63 of thermoplastic material emerges from the oven 59 after the annealing operation is completed and passes into the bite of the polishing unit 60 between the heated drum 78, and the endless belt 79 supported, driven, and adjusted in the manner previously described in connection with the polishing unit 40 of the apparatus illustrated in Fig. 1. After the polished strip 63 emerges from the polishing unit 60, it is directed into contact with the cooling drums 80, 81, 82, and 83 of the cooling unit 61. The windup unit 62 serves to roll the strip 63 into a bundle 64 of predetermined length for subsequent removal to the sizing and inspection apparatus (not shown) on which the material is cut to the proper dimensions, inspected, and packaged for subsequent use.

Temperature ranges employed in the treatment of single ply material, such as the strip 63, may vary slightly from that employed in multiple ply strips, such as the laminated strip 23. In general, however, the temperature differentials employed as between the oven 59 and the polishing unit 60 will be maintained such that the temperature to which the strip 63 is subjected in the polishing unit 60 will be substantially below that employed in the annealing operation conducted in the oven 59.

It will be apparent that numerous modifications may be made in the apparatus previously described to carry out the process defined herein without in any way departing from the spirit or scope of the invention.

It is readily possible, within the purview of the present invention, to introduce one or more plies of cushioning or base material for bonding with the thermoplastic material at a suitable point in the operations. One or more rolls of cushioning or base material may, if desired, be substituted for the corresponding number of supply rolls 15 in the plying-up unit 21 so as to be fed through the apparatus of Fig. 1 with the strip 23 of thermoplastic material.

Since, in some instances, it is not necessary and may even be undesirable to subject such base material to the annealing step in the oven, one or more supply rolls 84 of base material may be supported in a suitable stand 85 between the oven 59 and the polishing unit 60 (Fig. 2). Thus, a strip of base material 86 may be fed into the bite between the belt 79 and the heated drum 78 with the strip 63 of thermoplastic material to facilitate bonding of the two strips together.

Moreover, the surfaces of the drums 41 or 78 in the polishing units 40 or 60, respectively, may, if desired, be suitably engraved or etched to impart a pattern or design upon the exposed surface of the strips 23 or 63. Such patterning of the surface of the strips not only produces an attractive product, but affords a more tough and mar-resistant surface therefor.

While in accordance with the patent statutes two best known embodiments of the invention have been illustrated and described in detail, it is to be particularly understood that the invention is not limited thereto or thereby, but that the inventive scope is defined in the appended claims.

I claim:

1. The method of making a product embodying a plurality of superposed laminae of thermoplastic material produced by the deformation of a mass of the material which induces shrinkage in the laminae due to the internal stresses created therein in their formation, said method comprising the steps of subjecting the superposed laminae to the application of heat while the laminae are supported in relaxed condition and free from the application of pressure thereto to relieve the internal stresses in the individual laminae and to render them tacky; separating the superposed laminae to permit the escape of entrapped air and gases without varying the superposed relation thereof; and reducing the temperature of the annealed laminae and simultaneously applying pressure to the superposed laminae for intimately bonding them together and producing a highly polished surface on one of the exposed laminae.

2. The method of making a product embodying a plurality of superposed laminae of thermoplastic material produced by the deformation of a mass of the material which induces shrinkage in the laminae due to the internal stresses created therein in their formation, said method comprising the steps of subjecting the superposed laminae to the application of heat while the laminae are supported in relaxed condition and wholly free from the application of pressure thereto to relieve the internal stresses in the individual laminae and to render them tacky; temporarily separating at least one of the laminae from the remaining laminae to vent the air and gasses accumulated therebetween; reassembling the several laminae in their original positions; and reducing the temperature of the annealed laminae and simultaneously applying pressure to the superposed laminae for intimately bonding them together and producing a highly polished surface on one of the exposed laminae.

3. The method of making a product embodying a plurality of superposed laminae of thermoplastic material produced by the deformation of a mass of the material which induces shrinkage in the laminae due to the internal stresses created therein in their formation, said method comprising the steps of subjecting the superposed laminae to the application of heat while the laminae are supported in relaxed condition and wholly free from the application of pressure to relieve the internal stresses in the individual laminae and to render them tacky; temporarily spreading the several laminae apart to remove air or gasses which have become entrapped therebetween; restoring the several laminae to their original superposed positions; and reducing the temperature of the annealed laminae and applying pressure to the superposed laminae for intimately bonding them together and producing a highly polished surface on one of the exposed laminae and a roughened surface on the other of the exposed laminae.

ROBERT L. MOORE.

REFERENCES CITED

The following references are of record in the file of this patent:

UNITED STATES PATENTS

| Number | Name | Date |
|---|---|---|
| 1,818,504 | Pfeiffer | Aug. 11, 1931 |
| 1,882,715 | Angier | Oct. 18, 1932 |
| 2,091,124 | Stewart | Aug. 24, 1937 |
| 2,177,661 | Kimble | Oct. 31, 1939 |
| 2,317,409 | Seaton | Apr. 27, 1943 |
| 2,434,541 | Bierer | Jan. 13, 1948 |
| 2,442,443 | Swallow | June 1, 1948 |